A. E. JOHNSON.
LUBRICATING APPARATUS.
APPLICATION FILED AUG. 7, 1917.
1,266,272.
Patented May 14, 1918.
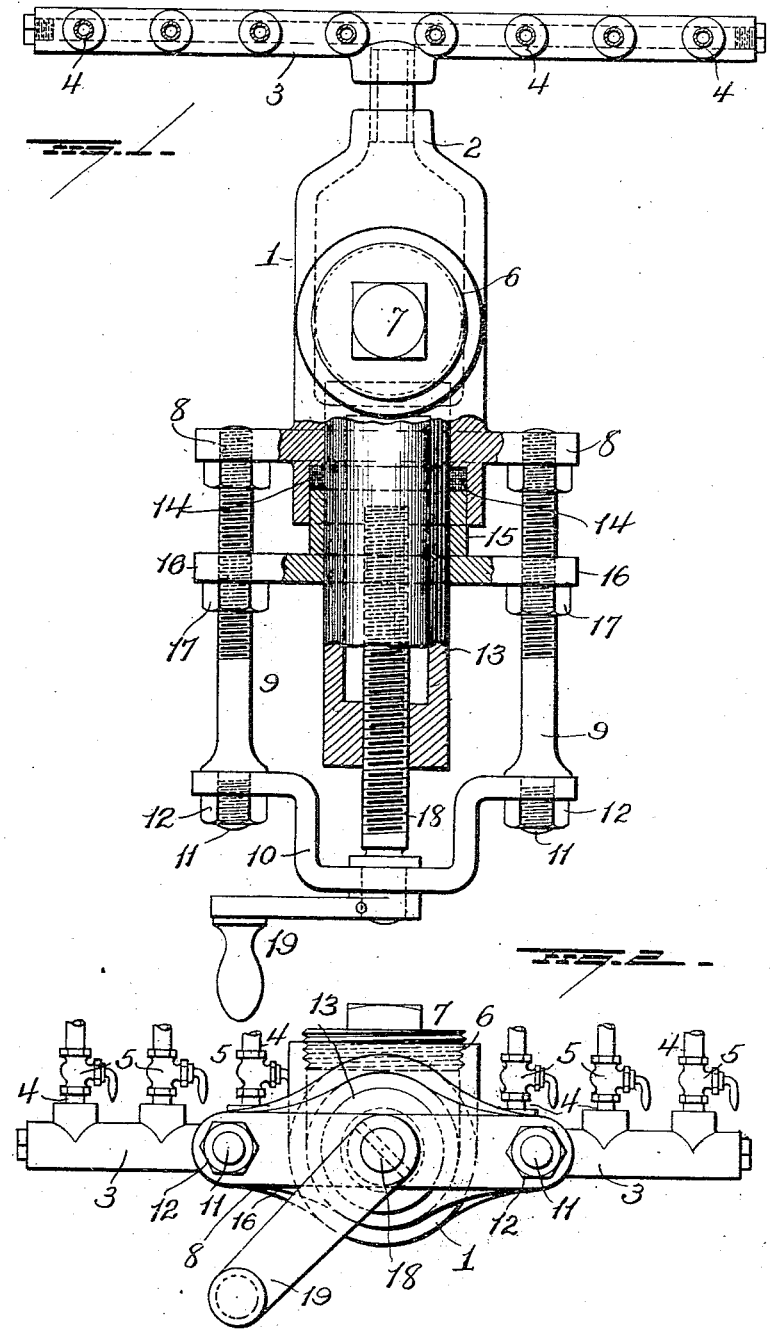
WITNESSES
E. L. Nottingham
G. F. Downing
INVENTOR
A. E. Johnson
By Seymour & Bright
Attorneys

UNITED STATES PATENT OFFICE.

AMOS ELLMAKER JOHNSON, OF NORTHUMBERLAND, PENNSYLVANIA, ASSIGNOR OF ONE-THIRD TO EDMUND G. VAN ALEN AND ONE-THIRD TO SAMUEL D. BURK, BOTH OF NORTHUMBERLAND, PENNSYLVANIA.

LUBRICATING APPARATUS.

1,266,272.  Specification of Letters Patent.  Patented May 14, 1918.

Application filed August 7, 1917. Serial No. 184,943.

*To all whom it may concern:*

Be it known that I, AMOS E. JOHNSON, a citizen of the United States, and a resident of Northumberland, in the county of Northumberland and State of Pennsylvania, have invented certain new and useful Improvements in Lubricating Apparatus; and I do hereby declare the following to be a full, clear, and exact description of the invention, such as will enable others skilled in the art to which it appertains to make and use the same.

This invention relates to improvements in lubricating apparatus,—the object of the invention being to provide simple and efficient means for supplying lubricant to a plurality of bearings from a common source and to so construct the device that it may be easily operated to force either oil or grease to any one or more of a number of bearings.

With this object in view the invention consists in certain novel features of construction and combinations of parts as hereinafter set forth and pointed out in the claims.

In the accompanying drawings, Figure 1 is a plan view of the lubricating apparatus showing an embodiment of my invention, and Fig. 2 is an end view.

1 represents a cylinder provided with an outlet 2 connected with a manifold 3. With this manifold a plurality of pipes 4 communicate for leading lubricant from the cylinder 1 to the various bearings of machinery to be lubricated. Each of the pipes 4 is provided with a valve 5 for controlling the passage of lubricant to the particular bearing or bearings which require lubrication.

An opening 6 is provided in the cylinder for filling the same and this opening may be closed by means of a threaded plug 7 or, a cap may be used for closing the filling opening instead of the screw plug.

The cylinder 1 is provided with arms 8, 8, which receive the forward ends of threaded rod 9. To the opposite ends of these rods a bail 10 is secured,—for which purpose the rods may be provided with threaded shanks 11 to receive nuts 12.

A plunger 13 enters the rear end of the cylinder 1 and is preferably made hollow. A suitable packing 14 encircles the plunger 13 within the cylinder 1 and may be suitably tightened or compressed by means of a gland 15. This gland is made with lateral arms 16 having holes for the free passage of the rods 9,—nuts 17 being provided on the threaded rods 9 for moving the gland and holding the same in proper position to compress the packing 14.

A screw 18 passes through the rear end of the hollow plunger 13 and is swiveled in the bail or yoke 10. A suitable crank or other hand operated device 19 is attached to the screw 18 for turning the same to operate the plunger 13 when it is necessary to force lubricant from the cylinder to the manifold and from the latter to one or more of the pipes 4 to bearings to be lubricated.

Having fully described my invention what I claim as new and desire to secure by Letters Patent, is:

1. In a lubricating apparatus, the combination with a cylinder and means for conveying lubricant from one end thereof, of arms on said cylinder, threaded rods secured to said arms, a yoke connecting the rear ends of said rods, a plunger entering the cylinder, a screw entering the plunger and swiveled to said yoke, and an operating device attached to said screw.

2. Lubricating apparatus comprising a cylinder, and means for connecting a plurality of pipes with the discharge end thereof, of a plunger entering the other end of said cylinder, threaded rods secured to the cylinder, a yoke secured to said arms, a screw swiveled in said yoke and entering said plunger, means for operating said screw, a gland through which said plunger passes, and means adjustably connecting said gland with the threaded rods.

In testimony whereof, I have signed this specification in the presence of two subscribing witnesses.

AMOS ELLMAKER JOHNSON.

Witnesses:
EDWARD C. MARSHALL,
JOHN H. VINCENT.